(12) United States Patent
Hwang et al.

(10) Patent No.: US 10,534,653 B2
(45) Date of Patent: Jan. 14, 2020

(54) HYPERVISOR-BASED VIRTUAL MACHINE ISOLATION APPARATUS AND METHOD

(71) Applicant: ELECTRONICS AND TELECOMMUNICATIONS RESEARCH INSTITUTE, Daejeon (KR)

(72) Inventors: Woomin Hwang, Daejeon (KR); Sung-Jin Kim, Daejeon (KR); Byung-Joon Kim, Daejeon (KR); Hyunyi Yi, Incheon (KR); Chulwoo Lee, Daejeon (KR); Hyoung-Chun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 81 days.

(21) Appl. No.: 15/810,790

(22) Filed: Nov. 13, 2017

(65) Prior Publication Data

US 2018/0300182 A1 Oct. 18, 2018

(30) Foreign Application Priority Data

Apr. 18, 2017 (KR) .................. 10-2017-0049969

(51) Int. Cl.
*G06F 9/50* (2006.01)
*G06F 9/455* (2018.01)

(52) U.S. Cl.
CPC ........ *G06F 9/5077* (2013.01); *G06F 9/45558* (2013.01); *G06F 9/505* (2013.01); *G06F 9/5083* (2013.01); *G06F 2009/4557* (2013.01)

(58) Field of Classification Search
CPC ....... G06F 9/505; G06F 9/5077; G06F 9/5083
See application file for complete search history.

(56) References Cited

U.S. PATENT DOCUMENTS 6,587,937 B1 * 7/2003 Jensen ................ G06F 12/0842
711/119
8,489,846 B1 * 7/2013 Jensen .................... G06F 21/74
711/173
(Continued)

FOREIGN PATENT DOCUMENTS

KR 10-1668399 B1 10/2016

OTHER PUBLICATIONS

Yao Wang et al., "Secure Dynamic Memory Scheduling against Timing Channel Attacks," 2017 IEEE International Symposium on High Performance Computer Architecture, Feb. 2017.
(Continued)

*Primary Examiner* — Chat C Do
*Assistant Examiner* — Douglas M Slachta
(74) *Attorney, Agent, or Firm* — LRK Patent Law Firm

(57) ABSTRACT

A hypervisor-based virtual machine isolation apparatus and method. The hypervisor-based virtual machine isolation method performed by the hypervisor-based virtual machine isolation apparatus includes when a hypervisor starts to run virtual machines, allocating one or more colors to each of the virtual machines, allocating a page frame corresponding to the allocated colors to the corresponding virtual machine, allocating an accessible core depending on the colors of the virtual machine, and performing isolation between virtual machines corresponding to an identical color by changing a temporal/spatial scheduling order between the virtual machines corresponding to the identical color.

17 Claims, 7 Drawing Sheets

(56) References Cited

U.S. PATENT DOCUMENTS

| | | | | |
|---|---|---|---|---|
| 8,799,554 | B1* | 8/2014 | Vincent | G06F 9/5016 |
| | | | | 711/6 |
| 8,924,684 | B1* | 12/2014 | Vincent | G06F 12/1027 |
| | | | | 711/203 |
| 9,058,183 | B2* | 6/2015 | Woller | G06F 9/4406 |
| 9,507,731 | B1* | 11/2016 | Zheng | G06F 12/109 |
| 9,569,277 | B1* | 2/2017 | Cropper | G06F 9/5083 |
| 9,588,788 | B1* | 3/2017 | Ramalingam | G06F 9/45558 |
| 2007/0079308 | A1* | 4/2007 | Chiaramonte | G06F 9/5077 |
| | | | | 718/1 |
| 2008/0320194 | A1* | 12/2008 | Vega | G06F 9/4812 |
| | | | | 710/263 |
| 2009/0204959 | A1* | 8/2009 | Anand | G06F 9/5027 |
| | | | | 718/1 |
| 2012/0047312 | A1* | 2/2012 | Nathuji | G06F 9/3832 |
| | | | | 711/6 |
| 2013/0086583 | A1* | 4/2013 | Uemura | G06F 9/4401 |
| | | | | 718/1 |
| 2013/0268930 | A1* | 10/2013 | Saidi | G06F 9/45558 |
| | | | | 718/1 |
| 2013/0332676 | A1* | 12/2013 | Kotla | G06F 12/0848 |
| | | | | 711/129 |
| 2018/0032443 | A1* | 2/2018 | Kaplan | G06F 12/1027 |
| 2018/0067674 | A1* | 3/2018 | Zhang | G06F 9/45558 |
| 2018/0285166 | A1* | 10/2018 | Roy | G06F 9/45558 |

OTHER PUBLICATIONS

Chuliang Weng et al., "TSAC: Enforcing Isolation of Virtual Machines in Clouds," IEEE Transactions on Computers, vol. 64, No. 5, pp. 1470-1482, May 2015.

V. Varadarajan et al., "Scheduler-based Defenses against Cross-VM Side-channels," 23rd USENIX Security Symposium, 2014 Proceedings, pp. 687-702.

Fangfei Liu et al., "CATalyst: Defeating Last-Level Cache Side Channel Attacks in Cloud Computing," 2016 IEEE International Symposium on High Performance Computer Architecture (HPCA), pp. 406-418.

Yuval Yarom et al., "Flush+Reload: a High Resolution, Low Noise, L3 Cache Side-Channel Attack," 23rd USENIX Security Symposium, 2014, pp. 719-732.

Fangfei Liu et al., "Last-Level Cache Side-Channel Attacks are Practical," 2015 IEEE Symposium on Security and Privacy, pp. 605-622.

Gorka Irazoqui et al., "S$A: A Shared Cache Attack that Works Across Cores and Defies VM Sandboxing—and its Application to AES," 2015 IEEE Symposium on Security and Privacy, pp. 591-604.

* cited by examiner ized environment, isolation incapacitation technology for extorting important information from other virtual machines by generating side channels (covert channels) between multiple virtual machines collectively accommodated in the same hardware in a virtualized environment based on two techniques, namely a flush+reload attack and a prime+probe attack, has been proposed. Further, as methods for responding to such isolation incapacitation technology, defense techniques have been proposed in "Scheduler-based Defenses against Cross-VM Side-channels", published in 2014 by USENIX Security, and "Catalyst: Defeating last-level cache side-channel attacks in cloud computing", published in 2015 by HPCA.

HYPERVISOR-BASED VIRTUAL MACHINE ISOLATION APPARATUS AND METHOD

CROSS REFERENCE TO RELATED APPLICATION

This application claims the benefit of Korean Patent Application No. 10-2017-0049969, filed Apr. 18, 2017, which is hereby incorporated by reference in its entirety into this application.

BACKGROUND OF THE INVENTION

1. Technical Field

The present invention relates generally to hypervisor-based virtual machine isolation technology and, more particularly, to technology for preventing side-channel (covert-channel) attacks by isolating virtual machines from a virtualization system.

2. Description of the Related Art

In a virtualized environment, isolation incapacitation technology for extorting important information from other virtual machines by generating side channels (covert channels) between multiple virtual machines collectively accommodated in the same hardware in a virtualized environment based on two techniques, namely a flush+reload attack and a prime+probe attack, has been proposed. Further, as methods for responding to such isolation incapacitation technology, defense techniques have been proposed in "Scheduler-based Defenses against Cross-VM Side-channels", published in 2014 by USENIX Security, and "Catalyst: Defeating last-level cache side-channel attacks in cloud computing", published in 2015 by HPCA.

The first defense technique is intended to propose a method for attenuating a data transmission bandwidth when side channels (covert channels) are generated, by additionally changing a cache area to be used through the guarantee of minimum additional runtime of a task that is currently being executed and that is represented by a Minimum RunTime guarantee (MRT) value. However, the first defense technique is effective only for an L1/L2 core-private cache in the situation in which related virtual machines share the same core with each other. Further, in a multi-core environment, in which a shared Last-Level Cache (LLC) is present, tasks executed on other cores may access the LLC regardless of whether the additional runtime time of a task currently being executed on a target core is guaranteed, thus making it impossible to achieve the original purpose of the current task.

The second defense technique is intended to propose a method for dividing an LLC into way partitions using a Cache Allocation Technology (CAT) function, which is supported by recent Intel processors, and prohibiting other virtual machines from accessing a specific partition, thus preventing side-channel (covert-channel) attacks made using the sharing of the LLC. This technique can separately store important information while suppressing performance deterioration using the hardware-supported partitioning mechanism of caches, but is disadvantageous in that the modification of an application program is required.

Such a conventionally proposed scheme is short of basic countermeasures which are capable of responding to the LLC, or requires the modification of an application program. Therefore, there is required the development of technology that prevents side-channel (covert-channel) attacks between virtual machines which are collectively accommodated while minimizing the deterioration of performance, merely by changing a virtualization platform to be used without modifying existing guest operating systems or application programs. In connection with this, Korean Patent No. 10-1668399 (Date of Publication: Oct. 21, 2016) discloses a technology related to "Hypervisor Isolation of Processor Cores."

SUMMARY OF THE INVENTION

Accordingly, the present invention has been made keeping in mind the above problems occurring in the prior art, and an object of the present invention is to prevent an attempt to extort important information from other virtual machines by making side-channel (covert-channel) attacks in a cloud environment without modifying application programs or guest operating systems.

Another object of the present invention is to implement technology for reinforcing virtual machine isolation while minimizing a performance load.

A further object of the present invention is to restrict access to a core-private cache made after an additional virtual machine periodically preoccupies a specific core on which a virtual machine is currently running.

Yet another object of the present invention is to control access by two or more virtual machines to the same cache set in a shared LLC.

Still another object of the present invention is to restrict the checking of traces of the usage of caches by other virtual machines by allowing each virtual machine to periodically access caches.

In accordance with an aspect of the present invention to accomplish the above objects, there is provided a hypervisor-based virtual machine isolation method performed by a hypervisor-based virtual machine isolation apparatus, including when a hypervisor starts to run virtual machines, allocating one or more colors to each of the virtual machines, allocating a page frame corresponding to the allocated colors to the corresponding virtual machine, allocating an accessible core depending on the colors of the virtual machine, and performing isolation between virtual machines corresponding to an identical color by changing a temporal/spatial scheduling order between the virtual machines corresponding to the identical color.

Allocating the one or more colors to each of the virtual machines may be configured to decide on the colors to be allocated to the virtual machine based on at least one of a number of Virtual Central Processing Units (VCPUs) corresponding to each virtual machine, information about the colors, utilization rates of a Last-Level Cache (LLC) for respective colors, and amounts of available memory for respective colors.

The hypervisor-based virtual machine isolation method may further include monitoring usage of caches corresponding to each of the virtual machines, and adjusting the colors allocated to the virtual machines based on results of monitoring usage of the caches.

Adjusting the colors may be configured to perform at least one of additional allocation in which a color to the corresponding virtual machine is additionally allocated, color change in which a color allocated to the virtual machine is changed, and color recovery in which the color allocated to the virtual machine is recovered.

Performing isolation between the virtual machines may be configured to wait for scheduling after setting core affinity in each VCPU of the virtual machine based on the allocated colors.

Performing the isolation between the virtual machines may include comparing a total number of VCPUs corresponding to all virtual machines with a total number of cores, if the total number of cores is greater than the total number of VCPUs, allocating one VCPU to each of the cores, if the total number of VCPUs is greater than the total number of cores, distributing the cores based on percentages of the VCPUs corresponding to all of the virtual machines for respective colors, and setting the core affinity to colors corresponding to the VCPUs.

The hypervisor-based virtual machine isolation method may further include calculating an isolability of VCPUs in which core affinity corresponding to a target core is set, determining whether there is a VCPU, a calculated isolability of which is greater than a threshold, if it is determined that there is the VCPU, the calculated isolability of which is greater than the threshold, determining whether there is a VCPU in which context switching to an additional virtual machine has occurred, and if it is determined that there is the VCPU in which context switching to the additional virtual machine has occurred, selecting the VCPU in accordance with a preset scheduling policy, and then scheduling the selected VCPU in the target core.

The hypervisor-based virtual machine isolation method may further include, if it is determined that there is no VCPU, a calculated isolability of which is greater than the threshold, delaying a scheduling selection time by a predetermined delay time.

The hypervisor-based virtual machine isolation method may further include, if it is determined that there is no VCPU, a calculated isolability of which is greater than the threshold, flushing at least one of a core-private cache and a set of an LLC, which are accessible by the virtual machine corresponding to a VCPU having a highest isolability.

The hypervisor-based virtual machine isolation method may further include if it is determined that there is no VCPU, a calculated isolability of which is greater than the threshold, dividing a set of an LLC corresponding to a VCPU having a highest isolability into a first partition and a second partition, allocating the first partition to the VCPU having the highest isolability, and allocating the second partition to VCPUs that share the set of the LLC.

In accordance with another aspect of the present invention to accomplish the above objects, there is provided a hypervisor-based virtual machine isolation apparatus, including a page allocation unit for, when a hypervisor starts to run virtual machines, allocating one or more colors to each of the virtual machines, and allocating a page frame corresponding to the allocated colors to the corresponding virtual machine, a core allocation unit for allocating an accessible core depending on the colors of the virtual machine, and a virtual machine scheduler for performing isolation between virtual machines corresponding to an identical color by changing a temporal/spatial scheduling order between the virtual machines corresponding to the identical color.

The page allocation unit may be configured to decide on the colors to be allocated to the virtual machine based on at least one of a number of Virtual Central Processing Units (VCPUs) corresponding to each virtual machine, information about the colors, utilization rates of a Last-Level Cache (LLC) for respective colors, and amounts of available memory for respective colors.

The hypervisor-based virtual machine isolation apparatus may further include a monitoring unit for monitoring usage of caches corresponding to each of the virtual machines, and a color adjustment unit for adjusting the colors allocated to the virtual machines based on results of monitoring usage of the caches.

The color adjustment unit may be configured to perform at least one of additional allocation in which a color to the corresponding virtual machine is additionally allocated, color change in which a color allocated to the virtual machine is changed, and color recovery in which the color allocated to the virtual machine is recovered.

The virtual machine scheduler may wait for scheduling after setting core affinity in each VCPU of the virtual machine based on the allocated colors.

The virtual machine scheduler may be configured to compare a total number of VCPUs corresponding to all virtual machines with a total number of cores, allocate the VCPUs to the cores or distribute the cores based on percentages of the VCPUs for respective colors, and then set the core affinity to colors corresponding to the VCPUs.

The virtual machine scheduler may be configured to select a VCPU, based on at least one of whether there is a VCPU, an isolability of which is greater than a threshold and in which core affinity corresponding to a target core has been set and whether context switching to an additional virtual machine has occurred, and to schedule the selected VCPU in the target core.

The isolability of the VCPU may be an update ratio of caches from a time at which virtual machines that use an identical color are finally scheduled to a time at which the isolability is calculated.

The isolability of the VCPU may be an update ratio of an LLC corresponding to the colors allocated to the virtual machines, from a time at which virtual machines that use an identical color are finally scheduled to a time at which the isolability is calculated.

The hypervisor-based virtual machine isolation apparatus may further include an identification unit for identifying the virtual machines by assigning identifiers to respective virtual machines based on control information of a virtualization-support function, or for identifying tasks corresponding to the virtual machines based on start register values of page tables that are used when the virtual machines are running.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
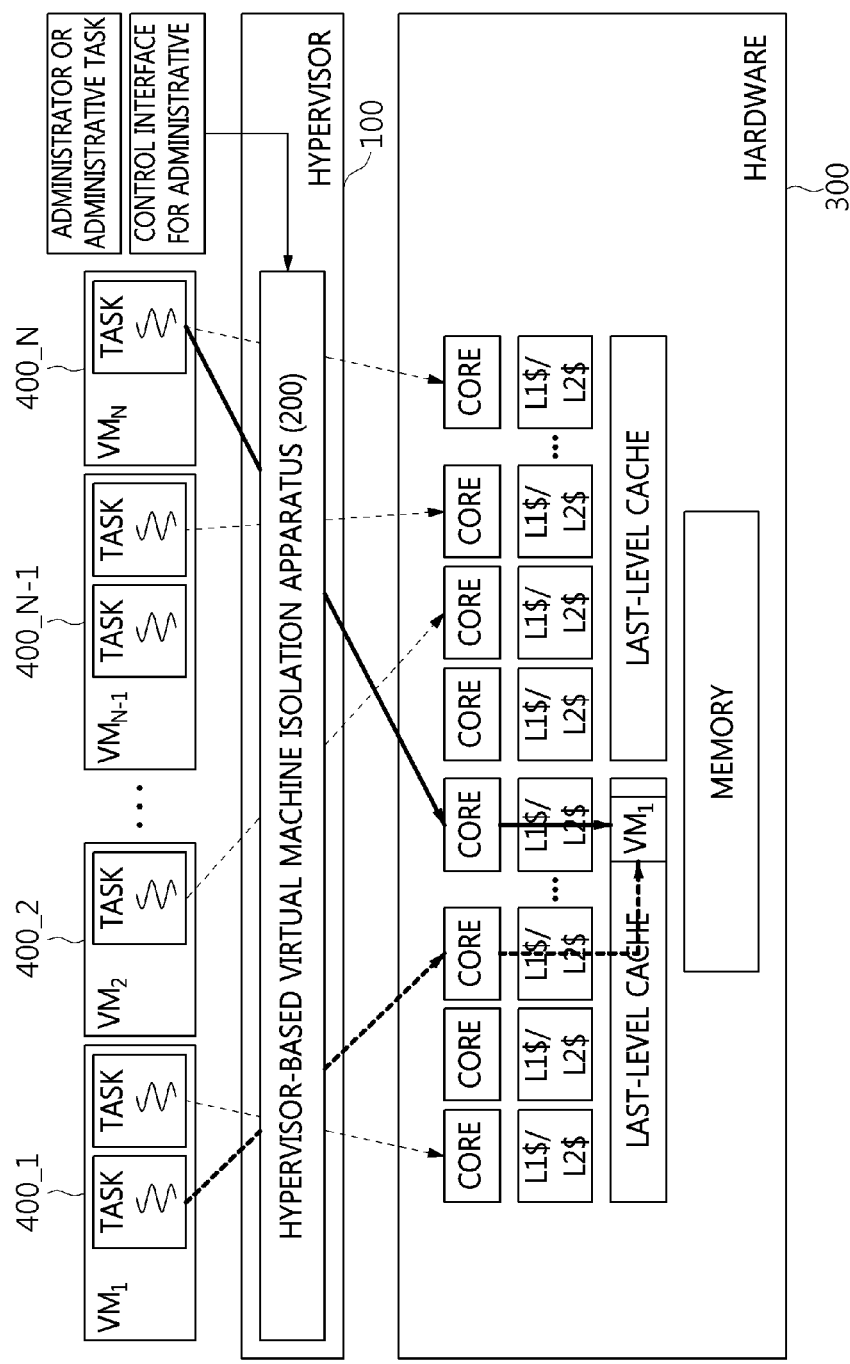
FIG. 1 is a diagram schematically showing a virtualization system to which a hypervisor-based virtual machine isolation apparatus according to an embodiment of the present invention is applied.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

FIG. 1 is a diagram schematically showing a virtualization system to which a hypervisor-based virtual machine isolation apparatus according to an embodiment of the present invention is applied.

As shown in FIG. 1, the virtualization system includes a hypervisor 100, a hypervisor-based virtual machine isolation apparatus 200, hardware 300, and multiple virtual machines 400.

The hypervisor-based virtual machine isolation apparatus 200 may be applied to a virtualization system in which multiple virtual machines 400 are collectively accommodated in specific hardware 300 in a cloud computing environment and then run while sharing resources with each other.

There may occur attacks intended to extort important information from other virtual machines by making side-channel (covert-channel) attacks using Central Processing Unit (CPU) caches in the virtualization system. Therefore, the hypervisor-based virtual machine isolation apparatus 200 according to the embodiment of the present invention may restrict the extortion of important information by attenuating the data transmission bandwidth of side channels (covert channels).

Further, the hypervisor-based virtual machine isolation apparatus 200 may restrict access to an L1/L2 core-private cache made after an additional virtual machine 400_2 periodically preoccupies a specific core on which a virtual machine 400_1 is currently running.

Furthermore, the hypervisor-based virtual machine isolation apparatus 200 may control the situation in which two or more virtual machines 400 simultaneously access the same cache set in a shared Last-Level Cache (LLC) such as an L3 cache, which is shared by cores.

When there are two or more virtual machines 400 that are allowed to access an LLC set and that are logically isolated, the hypervisor-based virtual machine isolation apparatus 200 may restrict the checking of traces of caches used by other virtual machines by allowing each virtual machine to periodically access the caches.

Hereinafter, the configuration of the hypervisor-based virtual machine isolation apparatus according to an embodiment of the present invention will be described in detail with reference to FIG. 2.

Figure 2:
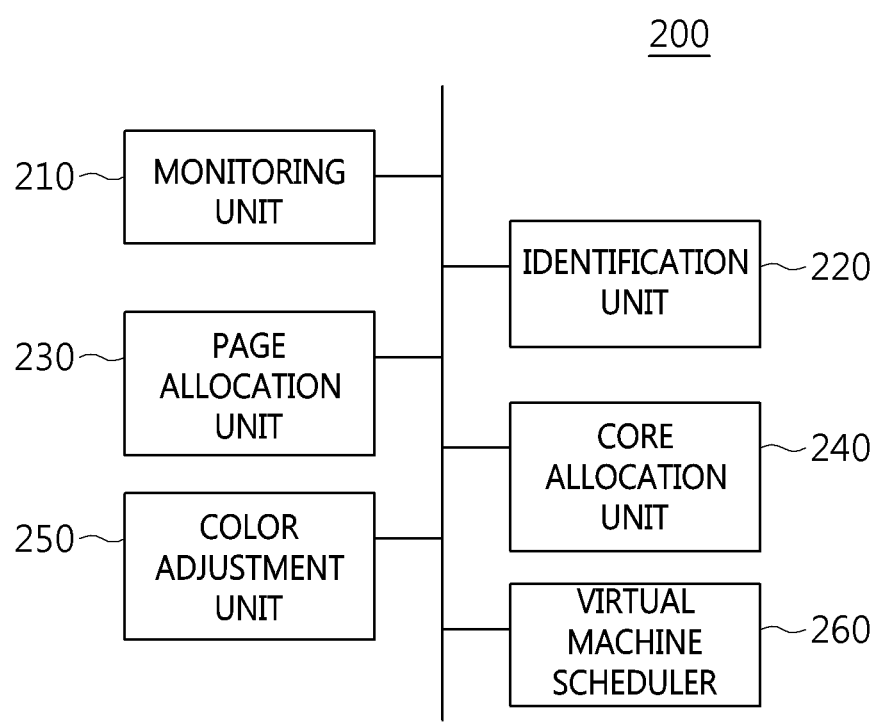
FIG. 2 is a block diagram illustrating the configuration of a hypervisor-based virtual machine isolation apparatus according to an embodiment of the present invention.

FIG. 2 is a block diagram illustrating the configuration of the hypervisor-based virtual machine isolation apparatus according to an embodiment of the present invention.

As shown in FIG. 2, the hypervisor-based virtual machine isolation apparatus 200 includes a monitoring unit 210, an identification unit 220, a page allocation unit 230, a core allocation unit 240, a color adjustment unit 250, and a virtual machine scheduler 260.

First, the monitoring unit 210 monitors the usage of caches corresponding to respective virtual machines.

The monitoring unit 210 performs cache monitoring so as to collect information about the usage of L1/L2/L3 caches in respective modules which are operated to reinforce isolation between the virtual machines.

Further, the monitoring unit 210 may collect information including at least one of L1/L2/L3 hit rates and update speeds for respective virtual machines, L1/L2/L3 hit rates and update speeds for respective colors, L1/L2/L3 cache utilization rates for respective virtual machines, and the amounts of cache used by respective virtual machines. Here, the monitoring unit 210 may collect information for each virtual machine, and may collect information for each task in each virtual machine as needed.

Next, the identification unit 220 identifies and manages a virtual machine that is currently running on a specific core or tasks within the corresponding virtual machine. The identification unit 220 may identify the virtual machines by assigning identifiers to respective virtual machines based on a Virtual Machine Control Structure (VMCS).

Further, the identification unit 220 may identify tasks corresponding to respective virtual machines based on start register values of page tables, which are used when the virtual machines are running. That is, the identification unit 220 may first identify virtual machines corresponding to tasks and may then distinguish respective tasks from each other using guest Control Register 3 (CR3) values.

In an environment in which a VMCS is not used, the identification unit 220 may use information about data structures in the hypervisor in which the states of respective virtual machines are stored.

Further, when the hypervisor starts to run the virtual machines, the page allocation unit 230 allocates one or more colors to each virtual machine. In addition, the page allocation unit 230 allocates page frames corresponding to the allocated colors to the virtual machine.

The page allocation unit 230 may be divided into a color decision module and a color-based page list management module. The color decision module decides on colors to be allocated to each virtual machine in response to a memory allocation request from the virtual machine.

Here, the color decision module may decide on the color to be allocated to each virtual machine based on at least one of the number of Virtual CPUs (VCPUs) corresponding to the virtual machine, information about colors corresponding to the virtual machine, the utilization rates of the LLC for respective colors, and the amounts of memory available for respective colors. Here, a reference threshold for the amount of available memory, which is a criterion for deciding whether to allocate multiple colors, may be an experimentally determined value.

Further, the color decision module may decide on the color to be allocated to the virtual machine, based on the ratio of the number of VCPUs that are currently being executed by virtual machines that have already run to the number of VCPUs that are executed by the virtual machine that is the target to which the color is to be allocated.

Furthermore, the color decision module may first allocate a color that is associated with an LLC set, separate from colors that are already used, may compare allocable amounts for respective colors with required amounts for respective colors, and may allocate multiple colors when the allocable amounts are greater than the reference threshold.

When the color decision module uses two or more processors, the color decision module may allocate colors between the processors in a balanced way, and may assign high priority to a color in which a small number of page frames is used or in which a Low-Level Cache (LLC) hit rate in a connected LLC set is low.

Further, the color decision module may sequentially apply a color that is used by the smallest number of virtual machines, a color that has the largest number of available page frames, and the color of an LLC set corresponding to the lowest utilization rate, among all available colors, and may then decide on one or more colors to be applied to each virtual machine.

Furthermore, the color-based page list management module tags the page frames with colors depending on the addresses thereof based on the number of colors to be used and a color classification method for page frames in response to a memory request from the virtual machine, and may then add color tags determined by the addresses of respective page frames to the management metadata of the corresponding page frames and manage the metadata through a data structure.

Here, the color-based page list management module may manage page frames having the same color using data structures for respective colors based on the bits of the addresses for distinguishing respective colors from each other. Further, the color-based page list management module may classify consecutive page frames, among page frames having the same color, into page frame bundles having a preset size, and may then manage the respective page frame bundles.

In particular, the color-based page list management module may generate a large-capacity bundle of consecutive page frames by binding the number of consecutive page frames that is identical to the largest applicable number, among numbers corresponding to multiples of 2, so that consecutive page frames can be allocated together, and may classify and manage the page frames for respective sizes of page frame bundles.

Further, when the number of allocated colors is one, the color-based page list management module may select page frames having the corresponding color. When the number of allocated colors is two or more, the color-based page list management module selects page frames having a color for which the occurrence of performance deterioration is minimized, by comparing criteria such as LLC utilization rates for respective colors, thus responding to the memory allocation request.

Here, the term "color" may mean one of the colors to be used which are decided on by a color management unit (not shown). The color management unit (not shown) may determine the number of colors to be used by detecting the maximum number of colors that can be used by the system, or may determine the number of colors to be used by receiving information about the number of colors from the user.

Further, in order to detect the maximum number of colors that can be used by the system, the color management unit (not shown) may detect the locations of bits of a page frame address used in a hash function for obtaining an index that is used when a slice of the LLC of the processor that is in use is selected, and may detect the maximum number of colors by combining the bit locations.

The locations of the bits used to detect the maximum number of colors do not belong to a page offset used by the system, among bits used in a hash function, and the number of colors to be used may be determined to be a positive number less than or equal to the maximum number of colors.

Further, the color management unit (not shown) may perform the procedure for detecting the maximum number of colors and determining the number of colors to be used only once, at the time at which the system boots or at the time at which the hypervisor-based virtual machine isolation apparatus 200 is activated, thus preventing the procedure from being unnecessarily repeated.

Next, the core allocation unit 240 allocates accessible cores to each virtual machine depending on the colors allocated to the virtual machine.

The color adjustment unit 250 adjusts colors allocated to isolation target virtual machines which are collectively accommodated in the same hardware in consideration of the workload of each virtual machine and system performance.

Here, the color adjustment unit 250 may perform at least one of additional allocation, in which a color is additionally allocated to each virtual machine to which colors have been previously allocated, color change, in which the colors allocated to each virtual machine are changed, and color recovery, in which the colors allocated to each virtual machine are recovered. By means of this operation, the color adjustment unit 250 may prevent the occurrence of performance deterioration attributable to imbalance in memory allocation at the system level.

Further, the color adjustment unit 250 may adjust the colors allocated to each virtual machine based on the results of monitoring the usage of caches. The color adjustment unit 250 may determine whether the adjustment of colors of each virtual machine is required and which amount is to be adjusted by using information about the amounts of memory used for respective colors and information about an associated cache hit rate, which are the results of monitoring the usage of caches.

The color adjustment unit 250 may perform additional color allocation when the amount of memory available for a color used by an arbitrary virtual machine is less than a preset threshold, or when there is a need to prevent the problem of the deterioration of a cache hit rate, which results in imbalance in the use of memory for respective colors due to the concentrated use of a specific color. Here, the color adjustment unit 250 may perform additional color allocation using the color allocation criterion of the virtual machine used in the color decision module of the page allocation unit 230.

The color adjustment unit 250 may decide on the color to be additionally allocated when the amount of memory available for the color allocated to the virtual machine is less than a preset value, or when a cache hit rate for the corresponding color is less than a preset value, and may additionally allocate the decided color to the corresponding virtual machine.

Further, the color adjustment unit 250 may perform color change in the situation in which, in the same condition as that of additional color allocation, there are no remaining colors, so that the change of a color must be performed, and in the situation in which the need to respond to a change in the load of the virtual machine occurs. The color adjustment unit 250 may terminate the performance of color change when the movement of data stored in the memory for the color, the use of which is released, is terminated according to a pre-copy or post-copy policy.

The color adjustment unit 250 may select the color to be changed from among colors currently used by the corresponding virtual machine, and may change the color to another color when the amount of memory available for each color allocated to the virtual machine is less than a preset value or when a cache hit rate for a specific color is less than a preset value.

Here, the color adjustment unit 250 may select the color that was previously allocated to the virtual machine as a replacement target color when, among the colors allocated to the virtual machine, the amount of available memory is less than a preset value, when, for each previously allocated color, multiple virtual machines that share the corresponding color are present, or when the difference between the isolability values of the corresponding color exceeds a preset value.

Further, the color adjustment unit 250 may perform color recovery in order to avoid sharing a color with other virtual machines or increase the utilization rate of an infrequently used color. Here, the threshold required by the color adjustment unit 250 to determine whether to perform additional allocation, color change, or color recovery may be experimentally determined.

When, for multiple colors allocated to a certain virtual machine, the amount of memory having the corresponding color currently used by the virtual machine is less than a preset value, the color adjustment unit 250 may select the corresponding color as a recovery target color. Further, the color adjustment unit 250 may allocate memory having another color, which is currently used by the certain virtual machine, may transfer the data stored in the memory having the recovery target color to the allocated memory having the other color, and may return both the recovery target color and page frames included in the recovery target color to the hypervisor after the data has been transferred.

Finally, the virtual machine scheduler 260 changes a temporal/spatial scheduling order between virtual machines corresponding to the same color, and then performs isolation between the virtual machines corresponding to the same color. By means of this isolation, the hypervisor-based virtual machine isolation apparatus 200 may restrict attacks made in a form in which the same execution order of virtual machines in each core and each processor is repeated.

The virtual machine scheduler 260 may set core affinity in the virtual CPU (VCPU) of each virtual machine based on the allocated colors upon generating the virtual machine, and may then wait for scheduling.

Here, the virtual machine scheduler 260 may set the initial core affinity of the VCPU, determined by colors and a currently running virtual machine, in the VCPU of the virtual machine in order to isolate virtual machines that share the same color from each other.

The virtual machine scheduler 260 may compare the number of VCPUs corresponding to the total number of virtual machines with the total number of cores and allocate VCPUs to respective cores based on the results of the comparison, or may distribute cores based on the percentages of the VCPUs for respective colors, and may set core affinity to colors corresponding to the VCPUs.

Further, the virtual machine scheduler 260 may select a VCPU based on at least one of whether there is a VCPU, the isolability of which is greater than a threshold and in which core affinity corresponding to a target core has been set, and whether there is a VCPU in which context switching to another virtual machine has occurred, and may schedule the selected VCPU in the target core.

That is, after waiting for scheduling, when the time at which a VCPU to be subsequently executed in an arbitrary core is selected is reached, the virtual machine scheduler 260 calculates the isolability of the VCPU in which core affinity is set in the target core and which waits to be executed in order to reinforce isolation in an L1/L2 core-private cache.

Here, the isolability of the VCPU may mean the update ratio of caches from the time at which virtual machines that use the same color are finally scheduled to the time at which the isolability is calculated.

Further, the isolability of the VCPU may mean the update ratio of an LLC corresponding to the colors allocated to the virtual machines from the time at which the virtual machines that use the same color are finally scheduled to the time at which the isolability is calculated.

Furthermore, the virtual machine scheduler 260 determines whether there is a VCPU, the isolability of which is greater than a threshold. If it is determined that there is no VCPU, the isolability of which is greater than the threshold, the virtual machine scheduler 260 may delay a scheduling selection time by a predetermined delay time, or may flush at least one of a core-private cache and an LLC set that the virtual machine corresponding to a VCPU having the highest isolability can access.

In contrast, if it is determined that there is a VCPU, the isolability of which is greater than the threshold, the virtual machine scheduler 260 may determine whether there is a VCPU in which context switching to another virtual machine has occurred, and may then determine whether an isolability condition for an L3 cache (LLC) is satisfied.

That is, the virtual machine scheduler 260 determines whether context switching from the virtual machine of a VCPU that was executed last on the corresponding core to the virtual machine of each VCPU has occurred.

Here, the virtual machine scheduler 260 detects whether context switching has occurred in the schedule history window of an LLC set connected to the target core depending on the allocation of colors to respective cores, and excludes context switching attributable to scheduling between VCPUs in the same virtual machine.

Here, the schedule history window may be managed for each core by the hypervisor, and the length of the schedule history window may be determined according to the number of scheduling records from the decision time to a past scheduling time at which a preset rate or more of an LLC set connected to the corresponding core has changed.

If it is determined that there is a VCPU in which context switching to another virtual machine has occurred, the virtual machine scheduler 260 may select a VCPU by applying the existing scheduling policy of the hypervisor to each VCPU, and may schedule the selected VCPU in the target core.

On the other hand, if it is determined that there is no VCPU in which context switching to another virtual machine has occurred, the virtual machine scheduler 260 may delay the current scheduling selection time by a predetermined delay time, or may flush at least one of a core-private cache and an LLC set that the virtual machine corresponding to the VCPU having the highest isolability can access.

Furthermore, if it is determined there is no VCPU in which context switching to another virtual machine has occurred, the virtual machine scheduler 260 may divide an LLC set corresponding to the VCPU having the highest isolability into a first partition and a second partition, may allocate the first partition to the VCPU having the highest isolability, and may allocate the second partition to VCPUs that share the LLC set. Further, the virtual machine scheduler 260 may schedule the VCPU in the target core.

Hereinafter, a hypervisor-based virtual machine isolation method performed by the hypervisor-based virtual machine isolation apparatus according to an embodiment of the present invention will be described in detail with reference to FIGS. 3 to 5.

Figure 3:
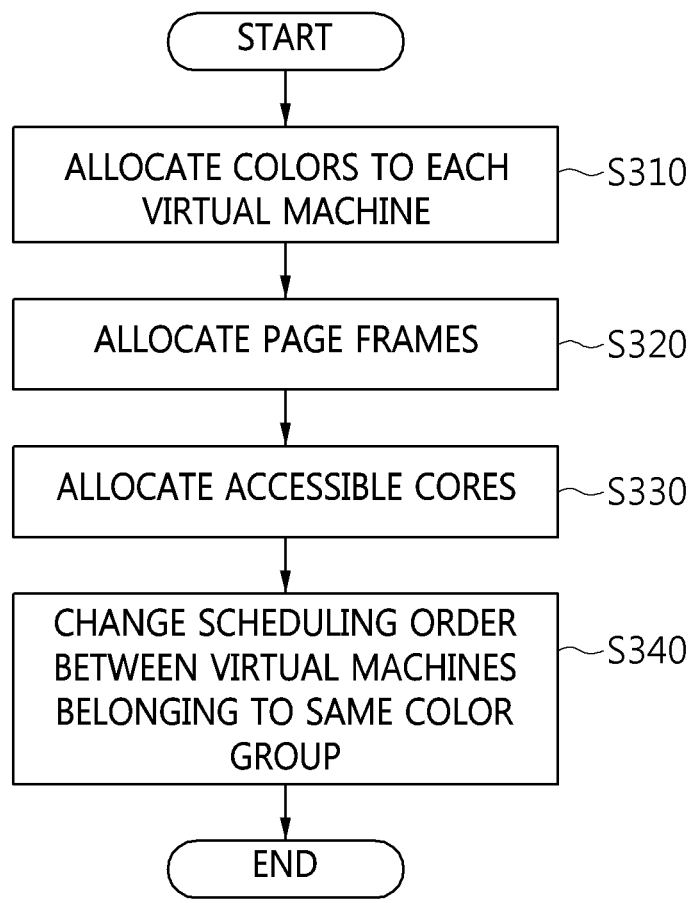
FIG. 3 is a flowchart for explaining a hypervisor-based virtual machine isolation method according to an embodiment of the present invention.

FIG. 3 is a flowchart for explaining a hypervisor-based virtual machine isolation method according to an embodiment of the present invention.

First, the hypervisor-based virtual machine isolation apparatus 200 allocates one or more colors to each virtual machine at step S310.

The hypervisor-based virtual machine isolation apparatus 200 allocates colors to virtual machines when the hypervisor starts to run the virtual machines. Here, the hypervisor-based virtual machine isolation apparatus 200 may decide on the colors to be allocated to each virtual machine based on at least one of the number of Virtual CPUs (VCPUs) corresponding to the virtual machine, information about colors that are in use, the utilization rates of an LLC for respective colors, the amounts of memory available for respective colors, and the number of available page frames for respective colors, and may allocate one or more colors to the virtual machine.

In particular, the hypervisor-based virtual machine isolation apparatus 200 may decide on the colors to be allocated to each virtual machine based on the ratio of the number of VCPUs that are currently being executed by virtual machines that have already run to the number of VCPUs that are executed by virtual machines that are the target to which colors are to be allocated.

Further, the hypervisor-based virtual machine isolation apparatus 200 may first allocate a color that is associated with an LLC set, separate from colors that are already used, may compare allocable amounts for respective colors with required amounts for respective colors, and may allocate multiple colors when the allocable amounts are greater than a reference threshold.

Furthermore, when two or more processors are used, the hypervisor-based virtual machine isolation apparatus 200 may allocate colors between the processors in a balanced way, and may assign high priority to a color in which a small number of page frames are used or a low LLC hit rate in a connected LLC set is low.

For the convenience of description, although the hypervisor-based virtual machine isolation apparatus 200 has been described as first performing the procedure for allocating colors to the virtual machines, the present invention is not limited thereto, and the hypervisor-based virtual machine isolation apparatus 200 may detect the maximum number of available colors and determine the number of colors to be used, or may determine the number of colors to be used by receiving information about the number of colors from the user.

Next, the hypervisor-based virtual machine isolation apparatus 200 may allocate page frames corresponding to the allocated colors to the virtual machine at step S320.

The hypervisor-based virtual machine isolation apparatus 200 may allocate page frames, corresponding to the colors allocated to the virtual machine, to the virtual machine. If it is determined at step S310 that one color is allocated to the virtual machine, the hypervisor-based virtual machine isolation apparatus 200 allocates page frames corresponding to the color to the virtual machine.

In contrast, if it is determined at step S310 that multiple colors are allocated to the virtual machine, the hypervisor-based virtual machine isolation apparatus 200 may compare criteria, such as LLC utilization rates for respective colors, with each other, may select page frames corresponding to colors that cause less performance deterioration, and may then allocate the selected page frames to the virtual machine.

Next, the hypervisor-based virtual machine isolation apparatus 200 allocates an accessible core to the virtual machine depending on the colors allocated to the virtual machine at step S330.

Figure 4:
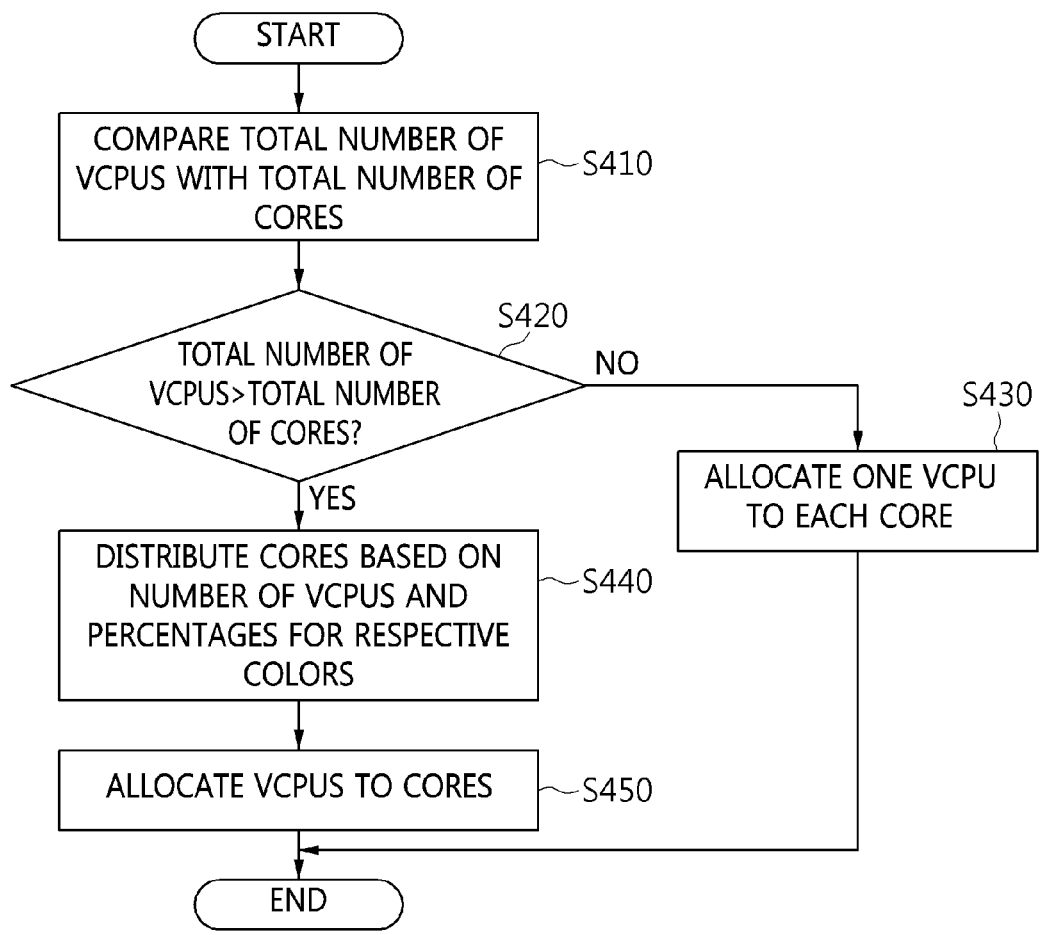
FIG. 4 is a flowchart for explaining a method for setting core affinity according to an embodiment of the present invention.

FIG. 4 is a flowchart for explaining a method for setting core affinity according to an embodiment of the present invention.

As shown in FIG. 4, the hypervisor-based virtual machine isolation apparatus 200 compares the total number of Virtual CPUs (VCPUs) with the total number of cores at step S410.

If, as a result of the comparison, the total number of VCPUs is less than or equal to the total number of cores at step S420, the hypervisor-based virtual machine isolation apparatus 200 sets core affinity by allocating one VCPU to each core at step S430.

In contrast, if the total number of VCPUs is greater than the total number of cores at step S420, the hypervisor-based virtual machine isolation apparatus 200 distributes the cores based on the number of VCPUs and percentages for respective colors at step S440.

Further, the hypervisor-based virtual machine isolation apparatus 200 sets core affinity by allocating the VCPUs to respective cores at step S450.

That is, the VCPUs may be distributed to one or more cores distributed to each color, using the colors allocated to the VCPUs.

Referring back to FIG. 3, the hypervisor-based virtual machine isolation apparatus 200 changes a scheduling order between virtual machines belonging to the same color group at step S340.

The hypervisor-based virtual machine isolation apparatus 200 performs isolation between virtual machines corresponding to the same color by changing a temporal/spatial scheduling order between the virtual machines corresponding to the same color. By means of this operation, the hypervisor-based virtual machine isolation apparatus 200 may restrict attacks made in a form in which the same execution order of virtual machines in each core and each processor is repeated.

The hypervisor-based virtual machine isolation apparatus 200 sets core affinity in the VCPU of the corresponding virtual machine based on the colors allocated to the virtual machine. Further, after the core affinity has been set, the hypervisor-based virtual machine isolation apparatus 200 waits for a VCPU to be executed until the time at which a VCPU to be subsequently executed in an arbitrary core is selected is reached.

Then, when the time at which the VCPU to be subsequently executed is selected is reached, the hypervisor-based virtual machine isolation apparatus 200 schedules the VCPU through the procedure of FIG. 5, which will be described later.

Figure 5:
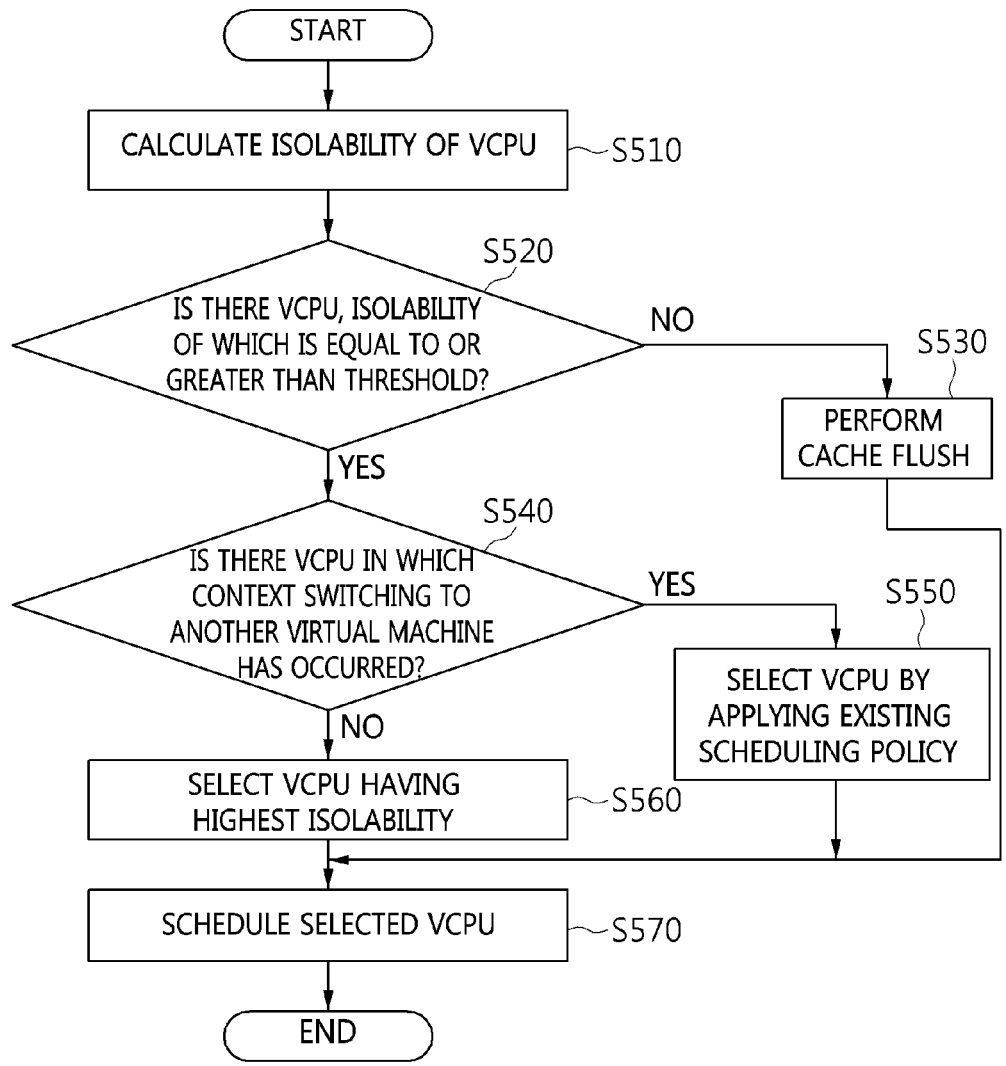
FIG. 5 is a flowchart for explaining a virtual CPU scheduling method according to an embodiment of the present invention.

FIG. 5 is a flowchart for explaining a VCPU scheduling method according to an embodiment of the present invention.

As shown in FIG. 5, the hypervisor-based virtual machine isolation apparatus 200 calculates the isolability of VCPUs at step S510.

The hypervisor-based virtual machine isolation apparatus 200 calculates the isolability of the VCPUs in which core affinity has been set in a target core and which are waiting to be executed. The hypervisor-based virtual machine isolation apparatus 200 may calculate, as first isolability, the update ratio of an L1/L2 cache from the time at which the virtual machines that use the same color are finally scheduled to the time at which the isolability is calculated.

Further, the hypervisor-based virtual machine isolation apparatus 200 may calculate, as second isolability, the update ratio of an L3 cache (LLC) corresponding to the colors allocated to the virtual machines, from the time at which the virtual machines that use the same color are finally scheduled to the time at which the isolability is calculated.

Furthermore, the hypervisor-based virtual machine isolation apparatus 200 determines whether there is a VCPU, the isolability of which is equal to or greater than a threshold at step S520.

At step S520, the hypervisor-based virtual machine isolation apparatus 200 may determine whether a condition for reinforcing isolation in an L1/L2 core-private cache is satisfied.

When both the first isolability and the second isolability are equal to or greater than a threshold, the hypervisor-based virtual machine isolation apparatus 200 determines that the isolability condition is satisfied. On the other hand, if the isolability condition is not satisfied, the hypervisor-based virtual machine isolation apparatus 200 may output calculated result values together with the cause of failure to satisfy the isolability condition.

If it is determined that there is no VCPU, the isolability of which is equal to or greater than the threshold, the hypervisor-based virtual machine isolation apparatus 200 performs a cache flush at step S530.

If the isolability condition for the L1/L2 core-private cache is not satisfied, the hypervisor-based virtual machine isolation apparatus 200 may flush at least one of an L1/L2 core-private cache and an LLC set that the virtual machine corresponding to the VCPU having the highest isolability can access.

For the convenience of description, it has been described that, when there is no VCPU, the isolability of which is equal to or greater than the threshold, the hypervisor-based virtual machine isolation apparatus 200 performs a cache flush. However, the present invention is not limited thereto, and the hypervisor-based virtual machine isolation apparatus 200 may delay a scheduling selection time by a predetermined delay time.

On the other hand, if it is determined that there is a VCPU, the isolability of which is equal to or greater than the threshold, the hypervisor-based virtual machine isolation apparatus 200 determines whether there is a VCPU in which context switching to another virtual machine has occurred at step S540.

The hypervisor-based virtual machine isolation apparatus 200 may detect whether additional context switching, other than context switching in the same virtual machine, is present in a schedule history window in an LLC set connected to the target core in the hypervisor. By means of this detection, the hypervisor-based virtual machine isolation apparatus 200 may determine whether an isolability condition for the L3 cache (LLC) is satisfied.

Here, if it is determined that there is a VCPU in which context switching to another virtual machine has occurred, the hypervisor-based virtual machine isolation apparatus 200 selects a VCPU by applying an existing scheduling policy to VCPUs at step S550.

However, if it is determined that there is no VCPU in which context switching to another virtual machine has occurred, the hypervisor-based virtual machine isolation apparatus 200 selects the VCPU having the highest isolability at step S560.

Further, the hypervisor-based virtual machine isolation apparatus 200 schedules the selected VCPU at step S570.

If the isolability condition for the L3 cache (LLC) is not satisfied, the hypervisor-based virtual machine isolation apparatus 200 selects a VCPU having the highest isolability from among candidate VCPUs. Further, the hypervisor-based virtual machine isolation apparatus 200 may flush all core-private caches and LLC sets that the virtual machine belonging to the selected VCPU can access.

Also, the hypervisor-based virtual machine isolation apparatus 200 may physically divide LLC sets accessible by the selected VCPU into two way partitions, may allocate a first partition generated from division to the VCPU having the highest isolability, and may allocate a second partition generated from division to other VCPUs that have previously shared the LLC sets.

For the convenience of description, although the hypervisor-based virtual machine isolation apparatus 200 has been described as selecting and scheduling the VCPU having the highest isolability at steps S560 and S570, the present invention is not limited thereto, and the hypervisor-based virtual machine isolation apparatus 200 may delay the runtime of the virtual machine that is currently running by a predetermined delay time, and may then delay the current scheduling time.

Further, the hypervisor-based virtual machine isolation apparatus 200 may perform the scheduling of the VCPU at step S570 after performing steps S530, S550, and S560.

Hereinafter, the configuration of a hypervisor-based virtual machine isolation apparatus according to another embodiment will be described in detail with reference to FIG. 6.

Figure 6:
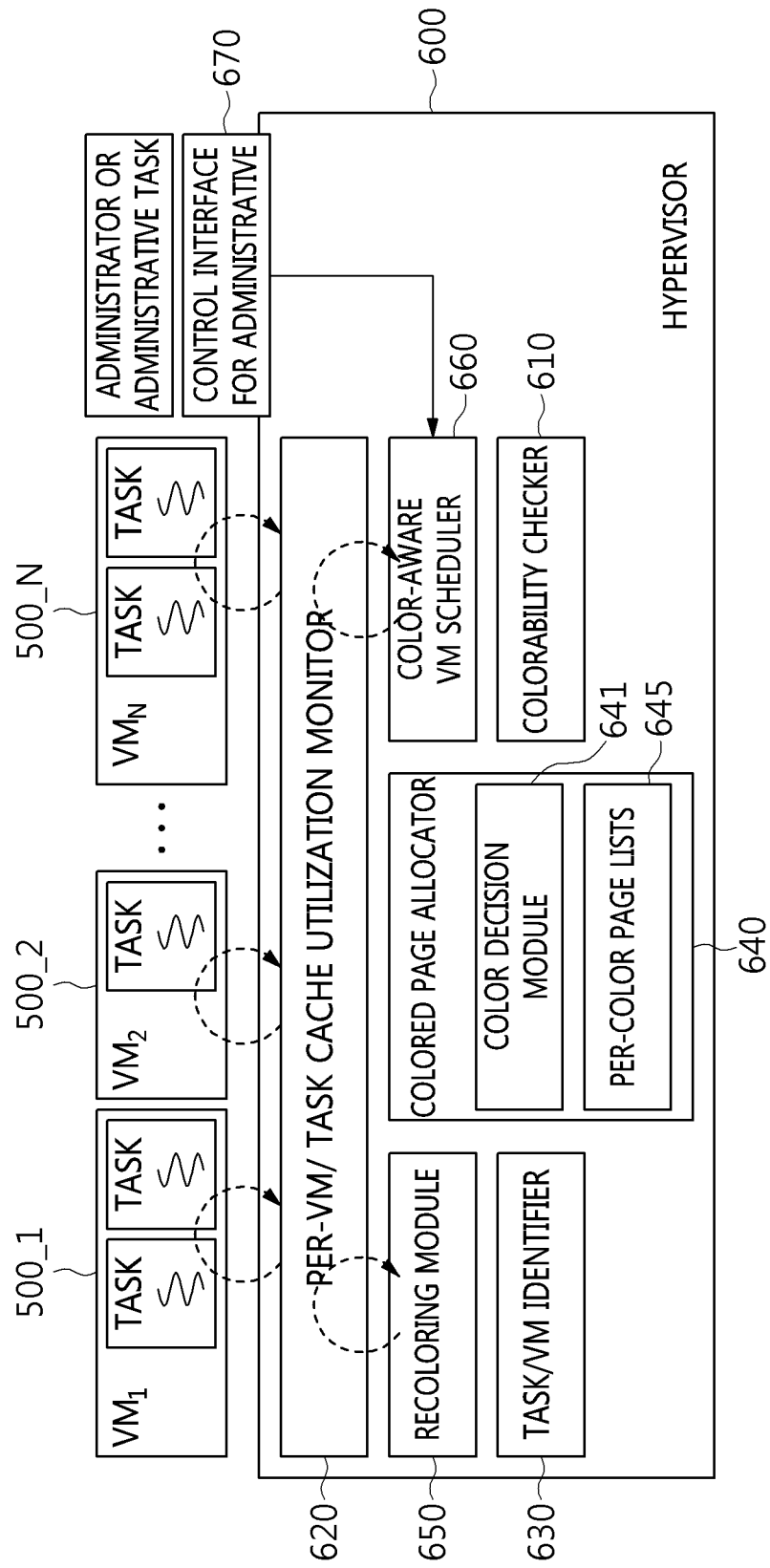
FIG. 6 is an exemplary diagram illustrating the configuration of a hypervisor-based virtual machine isolation apparatus according to another embodiment of the present invention.

FIG. 6 is a diagram showing the configuration of a hypervisor-based virtual machine isolation apparatus according to another embodiment of the present invention.

As shown in FIG. 6, a hypervisor-based virtual machine isolation apparatus 600 includes a color management unit (i.e. colorability checker) 610, a cache utilization monitor (i.e. per-Virtual Machine (VM)/task cache utilization monitor) 620, an identification unit (i.e. task/VM identifier) 630, a page allocation unit (i.e. colored page allocator) 640 including a color decision module 641 and a color-based page list management module (i.e. per-color page list module) 645, a recoloring module 650, a virtual machine scheduler (i.e. color-aware VM scheduler) 660, and a control interface (i.e. control interface for administrator) 670.

First, the colorability checker 610 detects the maximum number of colors that can be used in computer system hardware. Further, the colorability checker 610 determines the number of colors to be used. The colorability checker 610 is substantially identical to the color management unit (not shown) described in FIG. 2, and thus a repeated description thereof will be omitted.

Next, the per-VM/task cache utilization monitor 620 monitors the usage of caches corresponding to respective virtual machines. The per-VM/task cache utilization monitor 620 is substantially identical to the monitoring unit 210 of FIG. 2, and thus a repeated description thereof will be omitted.

Further, the task/VM identifier 630 identifies and manages at least one of a virtual machine that is currently running on a specific core and a task running on the virtual machine. The task/VM identifier 630 is substantially identical to the identification unit 220 of FIG. 2, and thus a repeated description thereof will be omitted.

Furthermore, the colored page allocator 640 allocates colors to each virtual machine, and allocates page frames corresponding to the allocated colors, thus responding to a memory allocation request from the virtual machine. The colored page allocator 640 may include the color decision module 641 and the per-color page list module 645.

The color decision module 641 may decide on one or more colors to be allocated to each virtual machine, and the per-color page list module 645 manages page frames using data structures for respective colors.

Here, each of the colored page allocator 640, the color decision module 641, and the per-color page list module 645 are substantially identical to the page allocation unit 230, the color decision module, and the color-based page list management module, respectively, which are described above with reference to FIG. 2, and thus a repeated description thereof will be omitted.

Furthermore, the recoloring module 650 adjusts the colors used by respective virtual machines based on the results of monitoring by the per-VM/task cache utilization monitor 620. In this case, the recoloring module 650 may perform additional color allocation, color change, color recovery, etc. The recoloring module is substantially identical to the color adjustment unit 250 of FIG. 2, and thus a repeated description thereof will be omitted.

Next, the color-aware VM scheduler 660 may change a temporal/spatial scheduling order between virtual machines that share the same color, thus inhibiting side-channel (covert-channel) attacks. The color-aware VM scheduler 660 is substantially identical to the virtual machine scheduler 260 of FIG. 2, and thus a repeated description thereof will be omitted.

Finally, the control interface 670 for administration provides an interface for setting parameters for the hypervisor-based virtual machine isolation apparatus 600 included in a host hypervisor and for viewing collected information.

Figure 7:
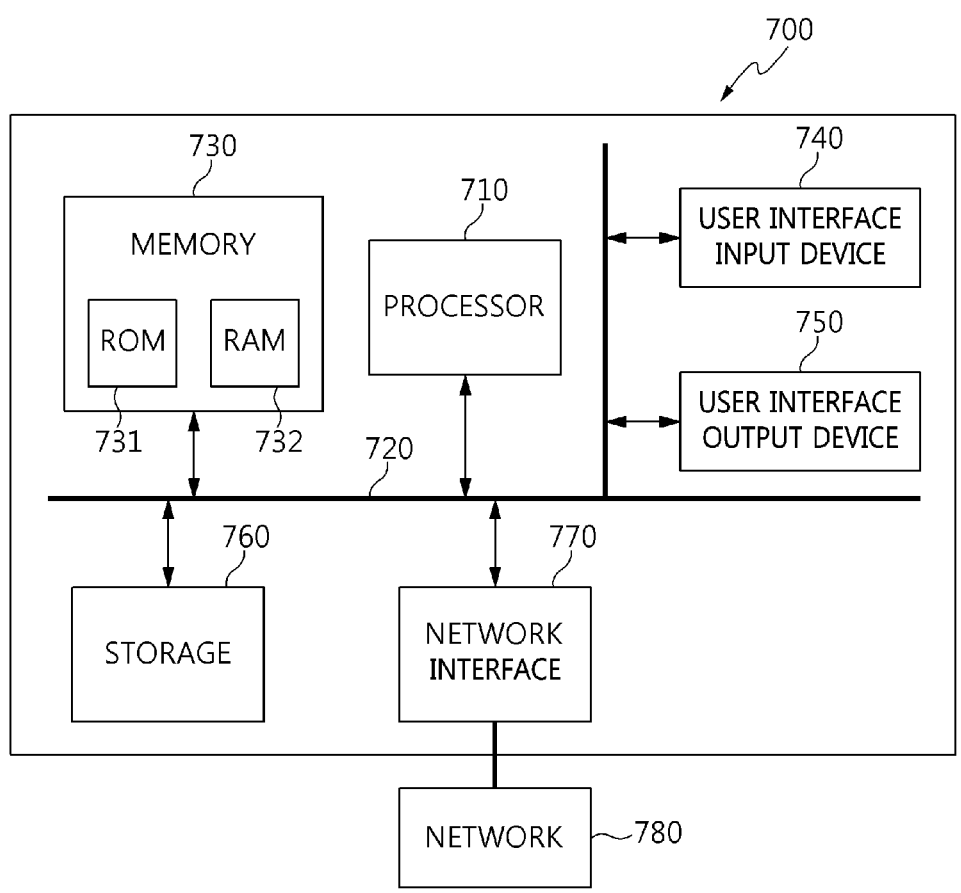
FIG. 7 is a block diagram illustrating a computer system according to an embodiment of the present invention.

FIG. 7 is a block diagram illustrating a computer system according to an embodiment of the present invention.

Referring to FIG. 7, an embodiment of the present invention may be implemented in a computer system 700 such as a computer-readable storage medium. As shown in FIG. 7, the computer system 700 may include one or more processors 710, memory 730, a user interface input device 740, a user interface output device 750, and storage 760, which communicate with each other through a bus 720. The computer system 700 may further include a network interface 770 connected to a network 780. Each of the processors 710 may be a CPU or a semiconductor device for executing processing instructions stored in the memory 730 or the storage 760. Each of the memory 730 and the storage 760 may be any of various types of volatile or nonvolatile storage media. For example, the memory 730 may include Read Only Memory (ROM) 731 or Random Access Memory (RAM) 732.

In accordance with the present invention, an attempt to extort important information from other virtual machines by making side-channel (covert-channel) attacks in a cloud environment may be prevented without modifying application programs or guest operating systems.

Further, in accordance with the present invention, technology for reinforcing virtual machine isolation while minimizing a performance load may be implemented.

Furthermore, in accordance with the present invention, access to a core-private cache made after an additional virtual machine periodically preoccupies a specific core on which a virtual machine is currently running may be restricted.

Furthermore, in accordance with the present invention, access by two or more virtual machines to the same cache set in a shared LLC may be controlled.

In addition, in accordance with the present invention, the checking of traces of the usage of caches by other virtual machines by allowing each virtual machine to periodically access caches may be restricted.

Therefore, the embodiment of the present invention may be implemented as a non-temporary computer-readable medium in which a computer-implemented method is recorded or in which computer-executable instructions are recorded. When the computer-executable instructions are executed by the processor, the instructions may perform the method according to at least one aspect of the present invention.

As described above, in the hypervisor-based virtual machine isolation apparatus and method according to the present invention, the configurations and schemes in the above-described embodiments are not limitedly applied, and some or all of the above embodiments can be selectively combined and configured so that various modifications are possible.

What is claimed is:

1. A hypervisor-based virtual machine isolation method performed by a hypervisor-based virtual machine isolation apparatus, the method comprising:
   when a hypervisor starts to run virtual machines, allocating one or more colors to each of the virtual machines, wherein the allocating the one or more colors to each of the virtual machines is performed based on a number of Virtual Central Processing Units (VCPUs) corresponding to each virtual machine, information about the colors, utilization rates of Last-Level Cache (LLC) for each of the colors, and amounts of available memory for each of the colors;
   allocating page frames corresponding to the one or more colors allocated to each of the virtual machines;
   allocating accessible cores depending on the one or more colors allocated to each of the virtual machines;
   performing isolation between virtual machines corresponding to an identical color by changing a temporal/ spatial scheduling order between the virtual machines corresponding to the identical color;

calculating an isolability of the Virtual Central Processing Units (VCPU's); and flushing at least one of a core-private cache and an Last-Level Cache (LLC) set, which are accessible by the virtual machine corresponding to a VCPU having a highest isolability, when there is no VCPU having a calculated isolability greater than a threshold.

2. The hypervisor-based virtual machine isolation method of claim 1, further comprising:

monitoring usage of caches corresponding to each of the virtual machines; and adjusting the one or more colors allocated to each of the virtual machines based on results of the monitoring of usage of caches.

3. The hypervisor-based virtual machine isolation method of claim 2, wherein the adjusting the one or more colors is configured to perform at least one of additional color allocation in which an additional color is allocated to each of the virtual machines, color change in which the one or more colors allocated to each of the virtual machines are changed, and color recovery in which the one or more colors allocated to each of the virtual machines are recovered.

4. The hypervisor-based virtual machine isolation method of claim 1, wherein the performing isolation between the virtual machines is configured to wait for scheduling after setting core affinity in each VCPU of each of the virtual machines based on the allocated one or more colors.

5. The hypervisor-based virtual machine isolation method of claim 4, wherein the performing isolation between the virtual machines comprises:

comparing a total number of VCPUs corresponding to all of the virtual machines with a total number of cores;

if the total number of cores is greater than the total number of VCPUs, allocating one of the VCPUs to each of the cores;

if the total number of VCPUs is greater than the total number of cores, distributing the cores based on percentages of the VCPUs corresponding to all of the virtual machines for each of the colors; and setting the core affinity using colors corresponding to the VCPUs.

6. The hypervisor-based virtual machine isolation method of claim 4, wherein the calculating an isolability of the VCPU's occurs for VCPU's in which core affinity corresponding to a target core is set, further comprising:

calculating an isolability of VCPUs in which core affinity corresponding to a target core is set;

determining whether there is a VCPU, the calculated isolability of which is greater than a threshold;

if it is determined that there is the VCPU, the calculated isolability of which is greater than the threshold, determining whether there is a VCPU in which context switching to a different virtual machine has occurred; and if it is determined that there is the VCPU in which context switching to the different virtual machine has occurred, selecting the VCPU in accordance with a preset scheduling policy, and then scheduling the selected VCPU in the target core.

7. The hypervisor-based virtual machine isolation method of claim 6, further comprising, if it is determined that there is no VCPU, the calculated isolability of which is greater than the threshold, delaying a scheduling selection time by a predetermined delay time.

8. The hypervisor-based virtual machine isolation method of claim 6, further comprising:

if it is determined that there is no VCPU, the calculated isolability of which is greater than the threshold, dividing an LLC set corresponding to a VCPU having a highest isolability into a first partition and a second partition;

allocating the first partition to the VCPU having the highest isolability; and allocating the second partition to VCPUs that share the LLC set.

9. A hypervisor-based virtual machine isolation apparatus, comprising:

a page allocation unit which, when a hypervisor starts to run virtual machines, allocates one or more colors to each of the virtual machines, and allocates page frames corresponding to the one or more colors allocated to each of the virtual machines; wherein the page allocation unit allocates the one or more colors to each of the virtual machines based on a number of Virtual Central Processing Units (VCPUs) corresponding to each virtual machine, information about the colors, utilization rates of Last-Level Cache (LLC) for each of the colors, and amounts of available memory for each of the colors;

a core allocation unit which allocates accessible cores depending on the one or more colors of allocated to each of the virtual machines;

a virtual machine scheduler which performs isolation between virtual machines corresponding to an identical color by changing a temporal/spatial scheduling order between the virtual machines corresponding to the identical color;

calculating an isolability of the Virtual Central Processing Units (VCPU's); and flushing at least one of a core-private cache and an Last-Level Cache (LLC) set, which are accessible by the virtual machine corresponding to a VCPU having a highest isolability, when there is no VCPU having a calculated isolability greater than a threshold.

10. The hypervisor-based virtual machine isolation apparatus of claim 9, further comprising:

a monitoring unit which monitors usage of caches corresponding to each of the virtual machines; and a color adjustment unit which adjusts the one or more colors allocated to each of the virtual machines based on results of the monitoring of usage of caches.

11. The hypervisor-based virtual machine isolation apparatus of claim 10, wherein the color adjustment unit is configured to perform at least one of additional color allocation in which an additional color is allocated to each of the virtual machines, color change in which the one or more colors allocated to each of the virtual machines are changed, and color recovery in which the one or more colors allocated to each of the virtual machines are recovered.

12. The hypervisor-based virtual machine isolation apparatus of claim 9, wherein the virtual machine scheduler waits for scheduling after setting core affinity in each VCPU of each of the virtual machines based on the allocated one or more colors.

13. The hypervisor-based virtual machine isolation apparatus of claim 12, wherein the virtual machine scheduler is configured to:

compare a total number of VCPUs corresponding to all of the virtual machines with a total number of cores, allocate the VCPUs to the cores or distribute the cores based on percentages of the VCPUs for each of the colors according to the comparison results, and set the core affinity using colors corresponding to the VCPUs.

14. The hypervisor-based virtual machine isolation apparatus of claim 12, wherein the virtual machine scheduler is configured to:

select a VCPU, based on at least one of whether there is a VCPU, an isolability of which is greater than a threshold and in which core affinity corresponding to a target core has been set, and whether context switching to a different virtual machine has occurred, and schedule the selected VCPU in the target core.

15. The hypervisor-based virtual machine isolation apparatus of claim 14, wherein the isolability of the VCPU is an update ratio of caches from a time at which virtual machines that use an identical color are finally scheduled to a time at which the isolability is calculated.

16. The hypervisor-based virtual machine isolation apparatus of claim 14, wherein the isolability of the VCPU is an update ratio of an LLC corresponding to the colors allocated to the virtual machines, from a time at which virtual machines that use an identical color are finally scheduled to a time at which the isolability is calculated.

17. The hypervisor-based virtual machine isolation apparatus of claim 9, further comprising an identification unit which identifies the virtual machines by individually assigning identifiers to the virtual machines based on control information of a virtualization-support function, or which identifies tasks corresponding to the virtual machines based on start register values of page tables that are used when the virtual machines are running.

* * * * *